UNITED STATES PATENT OFFICE.

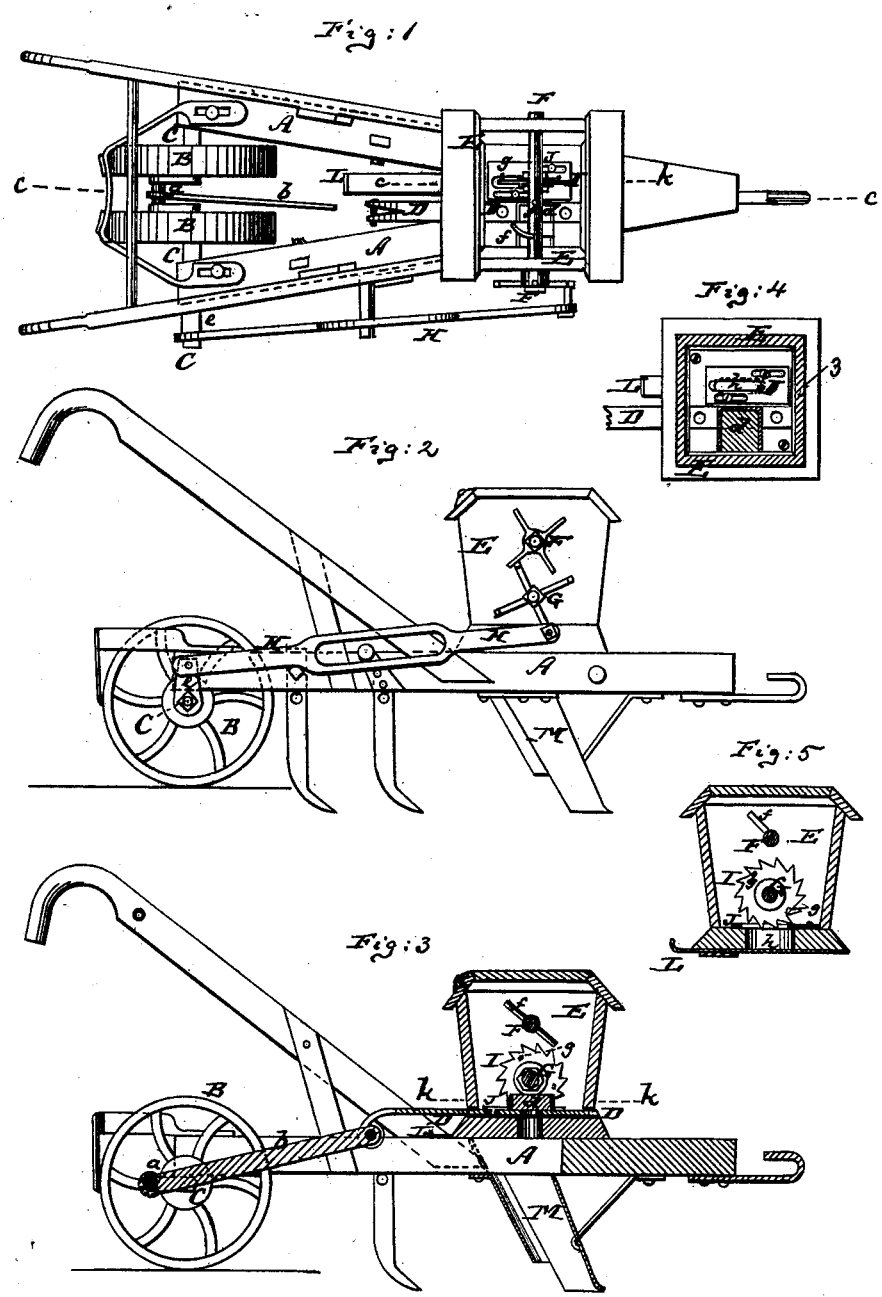

CHARLES DOMSCHKE, OF AUSTIN, TEXAS.

IMPROVEMENT IN CORN AND COTTON PLANTER.

Specification forming part of Letters Patent No. 198,581, dated December 25, 1877; application filed October 16, 1877.

*To all whom it may concern:*

Be it known that I, CHARLES DOMSCHKE, of Austin, in the county of Travis and State of Texas, have invented a new and Improved Corn and Cotton Planter, of which the following is a specification:

In the drawings, Figure 1 is a plan or top view of my improved corn and cotton planter. Fig. 2 is a side view of the same; Fig. 3, a vertical longitudinal section of the same, taken on the plane of the line $c\ c$, Fig. 1. Fig. 4 is a horizontal section of the seed-hopper on the line $k\ k$, Fig. 3. Fig. 5 is a detail vertical longitudinal section of the seed-hopper on the line $c\ k$, Fig. 1.

Similar letters of reference indicate corresponding parts in all the figures.

This invention relates to a new planting apparatus which can be used both for planting corn or cotton seed, and is more particularly intended for use in the Southern States.

The invention consists of the new combination of parts, hereinafter more fully described, and pointed out in the claim.

In the accompanying drawings, the letter A represents the frame of the seed-planter, said frame being made on the customary triangular form. In the rear this frame is supported by two wheels, B B, which are separated from each other, and mounted on the same axle C, that is hung in the frame A. The space between these two wheels B B is in line with the seed-discharge tube and furrow-opener M, that is suspended from the front of the frame A.

It will be seen that, by having the two wheels instead of one wheel behind the furrow-opener, said two wheels are permitted to travel each on the side of the furrow, and will therefore not pack the soil on the seed too tightly, which is often the case, especially in damp weather, where a single wheel is used directly behind the seed-drop. The single wheel, by pressing the seed down, causes it to be below the normal surface of the ground, while with the two wheels the seed remains in the upper part of the hill, because it is not pressed down, and may therefore be much sooner cultivated without covering the plants.

The crank $a$, which is formed on the shaft C between the two wheels B, connects, by a link, $b$, with the slide D for discharging corn. This slide is perforated, as indicated in Figs. 1 and 3, and travels, when reciprocated by the connecting-rod, beneath a fixed bridge or sweep, $d$, which is placed within the seed-hopper E, as clearly shown. Thus, when corn is to be planted, it is only necessary to put seed into the hopper E and operate the slide D by the means specified.

Through the hopper E are also passed two shafts, F and G, which receive intermittent rotary motion in opposite directions from a rod, H, that connects with a crank, $e$, of the shaft C. The front end of the rod H connects with one of a series of prongs that are formed at the end of the shaft G, and these prongs, during the consequent rotation of said shaft G, strike similar prongs on the shaft F, thus imparting rotary motion to the latter in the direction the reverse of that of the shaft G. The upper shaft F carries within the seed-hopper a series of projecting prongs, $f\ f$, for separating the cotton-seed, while the lower shaft G carries also within the seed-hopper, and directly above the discharge-opening $h$ for cotton-seed, a circular-saw-like wheel, I, which also has projecting prongs $g$ at its sides. These prongs also serve to separate the cotton-seed, while the teeth of the saw-like wheel or plate I take hold of the cotton-seed and discharge it from the hopper in the manner desired.

Above the discharge-opening $h$ for cotton-seed in the hopper E, I place a slotted plate, J, of sheet metal or equivalent material. The central slot of this plate, which is more fully shown in Fig. 4, is above the discharge-opening $h$, and by adjusting the position of the plate J in the hopper the size of this discharge-opening may be varied, so that more or less seed may be discharged. The side slots of the plate J receive the fastening-bolts, and permit the requisite adjustment, as indicated.

L is a sliding plate applied to the hopper beneath the opening $h$, for the purpose of closing the opening $h$ in case the apparatus is to be used for planting corn.

For planting corn, the slide D is connected to its rod $b$ and crank $a$, as shown in Fig. 3, so that the slide may be operated in the manner desired; but at the same time the slide L is pushed under the hopper, as in Fig. 5, to close the discharge-opening *h* usually employed for the cotton-seed, and the rod H or crank *e* is disconnected from the prongs of the shaft G. This leaves the cotton mechanism out of action and the corn-discharge in proper operation. But when cotton is to be planted, the rod H is connected to the shaft G, as shown in Figs. 1 and 2, the slide L drawn out, the slide D so placed that its discharge-openings will not be above the corn-discharge openings, and, moreover, the rod *b* and crank *a* are disconnected from the slide D, so as not to operate the same. If desired, however, the slide D may be operated simultaneously with the agitators, and both openings may also be left open in such case.

I claim as my invention—

The combination of the shaft C, having two separate cranks, *a e*, with the rod *b*, perforated slide D, rod H, pronged rotary shaft G, pronged rotary shaft F, and agitating devices *f* and I, and with the hopper E, having a discharge-opening beneath the slide D, and another separate discharge-opening, *h*, beneath the distributer I, substantially as specified.

CHARLES DOMSCHKE.

Witnesses:
JULIUS BIRNSTID,
KASPAR RISTERS.